Aug. 2, 1955

B. FRANTELLIZZI 2,714,421

CLOCKWORK DEVICE FOR CONTROLLING AN ELECTRIC
CIRCUIT AT PREDETERMINED HOURS

Filed Sept. 18, 1951

INVENTOR.
Biagio Frantellizzi
BY
A. John Michel
ATTORNEY

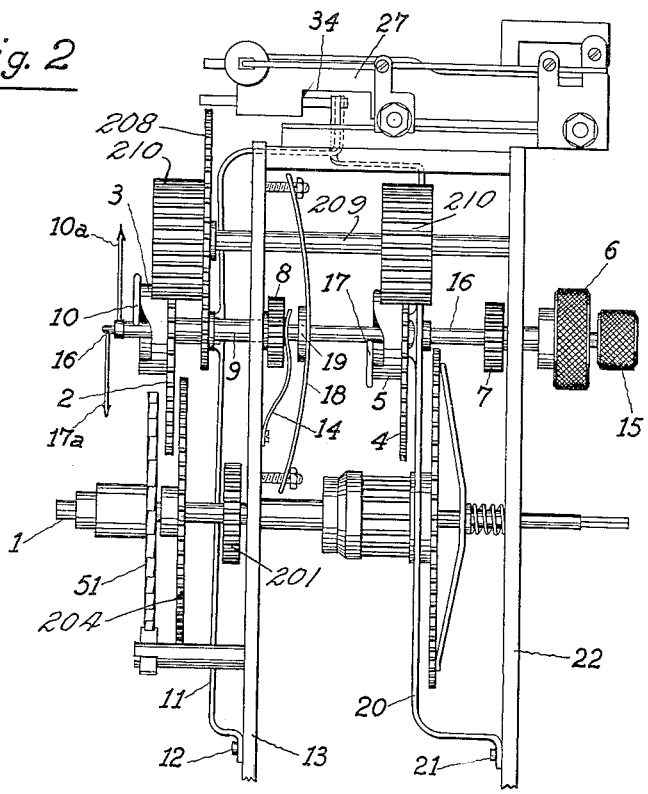
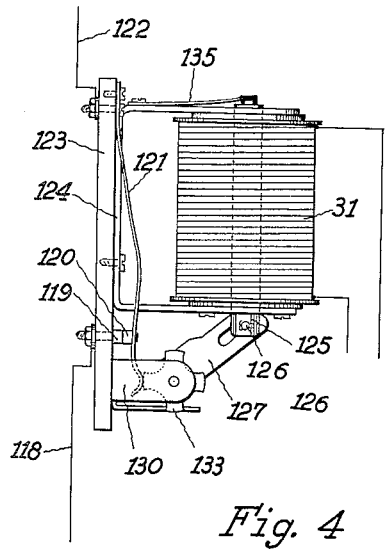
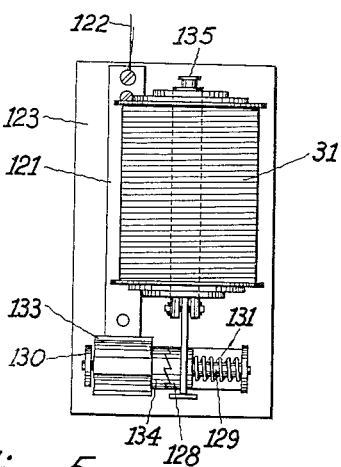

United States Patent Office 2,714,421
Patented Aug. 2, 1955

2,714,421

CLOCKWORK DEVICE FOR CONTROLLING AN ELECTRIC CIRCUIT AT PREDETERMINED HOURS

Biagio Frantellizzi, Rome, Italy

Application September 18, 1951, Serial No. 247,122

Claims priority, application Italy September 20, 1950

3 Claims. (Cl. 161—1)

This invention relates to a clockwork device for controlling an electric circuit at predetermined hours, e. g. the exciting circuit of an electromagnetic relay operating a switch controlling a circuit in which an audible and/or visual warning signal and other electrically controlled appliances may be inserted in parallel.

According to this invention, one clockwork may actuate two devices for the control of the same electromagnetic relay so that it will be possible to close the electric circuit at a predetermined hour, and to break it at a different predetermined hour. Should the closing and breaking take place at the same hours every day, it will be sufficient to adjust the devices in a permanent position.

The invention also comprises such means as to allow that in the absence of current at the time when the operation is required, the latter, which cannot take place at that moment, may be achieved when the current flows again. A device of the kind, as will easily be understood, must be designed preferably to work on a cycle extending over a whole day (24 hours).

The leading idea of the invention will now be explained.

In the alarm-clocks generally in use there is a gear wheel which receives a rotation movement from the clockwork. The wheel is subjected to the action of two parts, i. e. a spring tending to displace the wheel in the axial direction, and of a pin cooperating with the edge of a cam coaxial and rigidly connected with said wheel; said pin prevents axial displacement of the wheel excepting when, during the rotation of said wheel, a notch in the cam edge reaches the pin: at this moment the wheel moves in the axial direction under the influence of the associated spring, and this displacement of the wheel and spring causes operation of a mechanically operated bell. The position of the pin is adjustable to vary the hour at which the wheel will be axially displaced.

The leading idea of this invention is to make use of said spring (properly shaped) associated with such a gear in such a way that at the moment of its axial movement the displacement of one of the spring ends brings about the closing of an electric contact by suitable means, preferably for a very short time, whereby the exciting circuit of an electromagnetic relay controlling a switch is closed.

Since it may sometimes happen that no current flows in the conductors, the relay would not be excited if the spring merely actuated a contact, the excitation of the change-over relay would be lacking, and this might involve serious disadvantages: to prevent this, according to a preferred embodiment of the invention, the spring displaces an intermediatee member acting on a device so designed that said intermediate member is free to return to its idle position under the influence of a return spring when current flows, whilst when no current flows said intermediate member is blocked in a position other than the idle position and such that an electromagnet remains connected in the circuit in that condition, and on flowing current again this electromagnet acts to disengage the intermediate member and at the same time to excite the electromagnet which controls the above-mentioned switch.

One clockwork can by simple means be fitted with two different devices for axially moving the gears according to the invention, these devices being adjustable to different hours, so that during a period of 24 hours the electromagnet controlling the switch will be excited twice and will accomplish a closing and an opening of the circuit which controls any audible and/or visible warning signals or other electrically controllable appliances controlled by the electromagnetic relay.

Other features and advantages of the invention will appear from the following detailed description, reference being made to the accompanying drawings which show a preferred embodiment of the invention.

The specification and drawing should not be construed in an exclusive or limiting sense.

In the drawings:

Fig. 2 shows a side elevation of the clockwork, still with some parts omitted, on an enlarged scale;

Fig. 4 is a side elevation of the electromagnetic relay controlling the switch in its closed condition, the electromagnet being energized; and Fig. 5 is a front elevation of the relay of Fig. 4.

Figure 1:
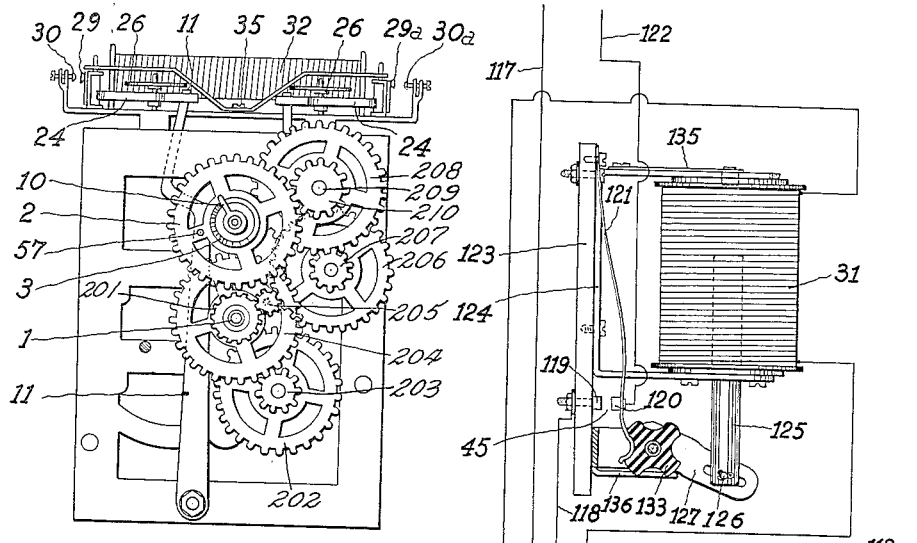
Fig. 1 shows a clockwork embodying the invention, the dial and other parts being omitted.

Central wheel shaft 1 transmits rotative motion to axially movable gear 2 whose let-off cam 3 is provided with a notch and to axially movable gear 4 whose associated let-off cam 5 is similarly provided with a notch by means of power take-off pinion 201 mounted on shaft 1, which pinion meshes with gear wheel 202 mounted on the same shaft as pinion 203 which, in turn, meshes with hour wheel 204. Pinion 201 (shown in broken lines in Fig. 1) also meshes with pinion 205 which meshes with gear wheel 206. The latter wheel is mounted on the same shaft as pinion 207 which meshes with gear wheel 208 mounted on shaft 209. Pinions 210 and 211 are mounted on the same shaft, pinion 210 meshing with gear wheel 2 and pinion 211 with gear wheel 4. The transmission of motion to the two gear wheels 2 and 4, whose rotation axes are in alignment with each other in the embodiment shown, is such that both wheels make one revolution every 24 hours.

The time of operation of gear wheel 2 may be determined or set by rotating the knurled knob 6. This knob drives a pinion 7, and this pinion, by means of a gear system not shown, transmits its rotation to pinion 8 mounted on the hollow shaft 9 which passes through wheel 2 and cam 3. Pin 10 and setting index hand 10a are fixedly mounted on shaft 9. The position of pin 10 is set by turning knob 6 and can be determined by reading the corresponding position of setting hand 10a on a 24-hour dial. At the set hour, pin 10 will register with the notch in cam 3 and tensioned flat spring 11 will, accordingly, cause axial movement of gear wheel 2. Spring 11 is fastened to plate 13 at 12 and its upper end will be used in the manner which will be explained hereinafter.

Pinion 8 is in frictional engagement with a spring 14 acting as a friction brake in such a way that said pinion and the parts associated therewith can be moved only by adjusting manipulation of knob 6, not accidentally, as by dragging or otherwise.

A knob 15 moves the shaft 16 carrying the control pin 17 for wheel 4, any accidental rotations thereof being prevented by spring 18 acting upon disc 19 fastened to shaft 16.

The left hand end of shaft 16 carries a setting index hand 17a for the readings on the same dial as referred to when describing the first device.

When the clock marks the hour for which wheel 4 has been adjusted, the latter is pushed, in a known manner, towards the left of Fig. 2 by spring 20 fastened to the rear plate 22 at 21, the upper end of said flat spring 20 being made use of in a similar manner to that which will be described for the upper end of spring 11.

Figure 3:
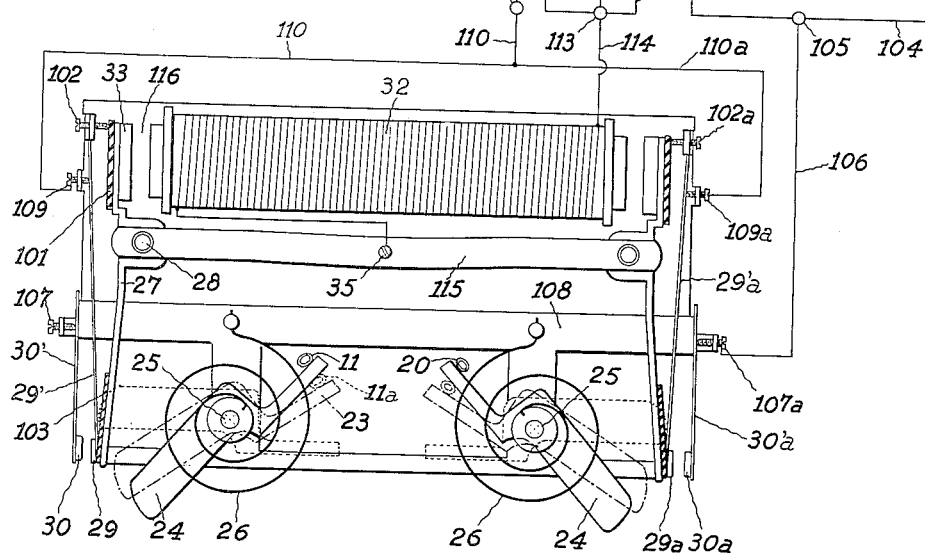
Fig. 3 is a plan view of the clockwork, on the same scale as Fig. 2.

Referring now to Fig. 3, there are shown therein the upper ends, which are rounded and coated with an insulating material, of springs 11 and 20. The parts associated with spring 11 only will be described hereinafter, since those associated with spring 20 are analogous and symmetrical.

In the idle position of the device, as shown in full lines in Fig. 3, spring 11 is loaded, and the arm 23 of a member 24 is in contact with it, which member 24 can freely turn on pivot 25 but is subjected to the action of a spiral spring 26 tending to return it to the position shown in Fig. 3 whenever member 24 is displaced therefrom.

When the hour arrives at which the action of gear 2 must take place, pin 10 registers with the notch on the edge of let-off cam 3, and spring 11 moves from the position shown in full lines in Fig. 3 in the direction of the position shown in dotted lines and designated by 11a. As spring 11 was under a tension, it moves beyond said position 11a, where the spring stops in its return movement. Member 24 receives an impulse which is sufficient to push said member to the position shown in dotted lines in Figure 3. During this movement, member 24 strikes lever 27 pivoted at 28 and easily displaces it, because lever 27 is restrained in its movements only by the weak leaf spring 29' on which contact 29 is mounted. It is to be noted that there is no electric connection between lever 27 and contact 29 or leaf spring 29', because an insulating layer 103 is applied to lever 27. Lever 27 is also insulated from its adjusting screw 102 by an insulating layer 101.

When member 24 contacts lever 27, the following circuit through electromagnet 32 is closed:

Conductor 104, terminal 105, conductor 106, set screw 107a, conductor member 108, pivot 25 and/or spring 26, member 24, lever 27, pivot 28, conducting bar 115, terminal 35, winding of electromagnet 32, conductor 114, terminal 113, conductor 112.

When electromagnet 32 is energized, armature 33 carried by lever 27 is attracted and said lever continues its swinging movement started by the impact of member 24. Contact 29 is pushed against contact 30, and the cooperation of contacts 29 and 30 closes the following circuit through the relay winding 31:

Conductor 104, terminal 105, conductor 106, set screw 107a, conducting member 108, set screw 107, leaf spring 30' on which contact 30 is mounted, contact 30, contact 29, leaf spring 29', set screw 109, wire 110, terminal 111, winding of electromagnet or relay 31, terminal 113, conductor 112.

Contacts 29 and 30 are both mounted on weak leaf springs (29' and 30' respectively) to easily yield to lever 27 and not to hinder its movement away from member 24.

Set screws 102 and 102a, 109 and 109a, conducting bar 115 and conducting member 108 are supported by an insulating structure, generally designated by reference numeral 116.

Set screws 109 and 109a are in conducting contact with the spring blades 29' and 29'a on which contacts 29 and 29a are respectively mounted; said set screws are connected by wires 110 and 110a. Set screws 107 and 107a are in conducting contact with leaf springs 30' and 30'a respectively as well as with conducting member 108.

Conductors 104 and 112 are connected with any suitable source of current.

The excitation of electromagnet or relay 31 brings about the operation of a switch which, in its successive operations alternately closes and opens the electric circuit to be controlled by the clock, on which any desired load (electric appliances) may be inserted. An embodiment of an electromagnetically controlled switch will be described hereinafter.

In lever 27 a notch 34 (see Fig. 2) is provided, in which the end of member 24 may enter when said member moves to the position shown in dotted lines in Fig. 3; but the swinging of lever 27 caused by magnetic attraction on armature 33 displaces said lever from the path of member 24 which will not be engaged in notch 34. Member 24 is then returned toward its normal position under the influence of its own spring 26. Of course, member 24 does not reach the exact position it had before being swung, because the upper end of spring 11 is now in the position shown at 11a. In this condition, member 24 takes the position shown in dash-dotted lines. Lever 27 also returns to the position shown in Fig. 3, owing to the resiliency of the blade or leaf spring 29' on which the contact 29 is fixed, because the circuit through electromagnet 32 has been interrupted when lever 27 has moved away from member 24.

The excitation of electromagnet or relay 31, which has actuated the change-over switch, has been instantaneous, and the circuit for said relay or electromagnet 31 is broken again.

If electric current is lacking when spring 11 moves, the swinging movement of lever 27 is not increased by the attraction exerted on armature 33 by electromagnet 32. Consequently, member 24 will be engaged in notch 34 on lever 27; the circuit through the coil of magnet 32 remains closed. When the current is fed again, coil 32 is excited, armature 33 is attracted, lever 27 swings and disengages member 24. The swinging of lever 27 closes the contacts 29 and 30, causing the relay excitation which had previously been lacking owing to current failure.

Likewise, when the second mechanism (wheel 4, cam 5, spring 20) moves at its set hour, the set will work which is seen on the right of Fig. 3 and which is formed of parts symmetrical to those above described and designated by reference numerals from 23 to 34, and a second operation of the electromagnetically controlled switch will take place as a consequence of contact 29a—30a being closed.

Electromagnetically controlled switches are well known in the art. For instance, in the lighting of interiors, there are many cases where a central lamp is to be switched on and off at a number of places, for instance from various entrance doors. In such cases, an electromagnetically controlled switch, or relay switch, is connected in series with the lamp, while the energization of the electromagnet or relay may be effected from any number of positions. An electromagnetically operated switch which may be used in the device of the present invention is illustrated in Figs. 3 to 5.

The winding of electromagnet or relay 31 is connected to terminals 111 and 113. Conductor 117 is also connected to terminal 113 and one pole of each electric appliance to be controlled by the clock is connected to the conductor 117.

A conductor 118 is connected to terminal 105 and leads to contact 119 of switch 45, the other contact 120 of which is supported by a leaf spring 121. The upper end of leaf spring 121 is connected to conductor 122 to which the other pole of each of the electric appliances to be controlled by the clock is connected. It will be seen that when contact 120 is pressed on contact 119 (that is when switch 45 is closed), electric current is supplied to any appliance connected to conductors 117 and 122 as stated above.

Contact 119 and the upper end of spring blade 121 are fastened to an insulating plate 123 to which is also fastened a bracket 124 supporting the electromagnet or relay 31, which is a vertically arranged plunger electromagnet. Plunger 125 which, when electromagnet 31 is not energized, is in the position shown in Fig. 3, is connected at its lower end, by means of a pin-and-slot connection 126, to an arm 127 to which the part 128 of a claw-clutch 128—134 is fastened. Part 128 is rotatably mounted on stationary shaft 129 carried by bracket 130, which also is fixed to insulating plate 123. A weak coil spring 131, which surrounds shaft 129, urges part 128 into engagement with part 134 (see Fig. 5). Pin-and-slot connection 126 allows for a lateral displacement of part 128 away from part 134.

On shaft 129 a member 133 is also rotatably mounted, which is made of an insulating material and to which part 134 of the claw-clutch is fastened. Member 133 has the general shape of a cylinder provided with four deep longitudinal grooves in the instance shown, where the teeth of the claw-clutch are eight. Said member has a frictional fit on shaft 129, so that it cannot rotate accidentally.

As shown in Figs. 3 and 4, the lower end of leaf spring 121 bears on member 133; also leaf spring 121 opposes any accidental displacement of member 133. When member 133 is in the position of Fig. 3, spring 121 rests in a groove thereof, and contacts 119, 120 are spaced apart: switch 45 is open.

When, however, member 133 is in the position of Fig. 4, contact 120 is pressed on contact 119: switch 45 is closed.

The operation of the electromagnetically controlled switch is as follows: starting from the position of Fig. 3 (opened switch), when the electromagnet 31 is energized, plunger 125 is sucked up and causes arm 127 to swing by an eighth of a revolution. During this swinging movement of arm 127, owing to the direction of slope of the teeth and to the pressure exerted by spring 131, the teeth of part 128 are kept in engagement with the teeth of part 134 which is accordingly rotated by an eighth of a revolution, so that member 133, to which part 134 is fastened, rotates as well and takes the position shown in Fig. 4 (closed switch). The position of plunger 125 and arm 127 as shown in Figs. 4 and 5, is a transitory position when the electromagnetically controlled switch is used in association with the device of the invention because as soon as the current through the winding of electromagnet or relay 31 is interrupted, plunger 125 falls down by gravitation and the action of leaf spring 135 which bears on the upper end of plunger 125 when this latter is in the position of Fig. 4. It is to be noted that during the downward movement of plunger 125, owing to the frictional engagement of member 133 on shaft 129, to the pressure of spring 121 on member 133, to the slope of the teeth of the claw-clutch and to the little strength of coil spring 131, said claw-clutch is inoperative. Accordingly, member 133 remains in the position that it had taken during the upward movement of plunger 125.

Reference numeral 136 denotes a support for arm 127 when the plunger is in its position of rest.

A very short energization of electromagnet 31 is sufficient to bring about a swinging of arm 127, that is an operation of switch 45. The successive energizations of electromagnet 31 alternatively cause the closure and the opening of switch 45.

Accordingly, the device of the invention will switch on the electrical appliances controlled thereby at a given predetermined hour and will switch them off at another predetermined hour.

Whilst a preferred embodiment of the invention has been described in detail, it is to be understood that changes and modifications can be adopted in practice and the parts may be substituted by other operatively equivalent parts without departing from the scope of the invention.

What I claim is:

1. A timed switch mechanism comprising, in combination, an electric circuit including a relay operating a switch, an electromagnet having an armature, a wheel member mounted for rotational and axial movement, timing means for rotating said member to complete one revolution every 24 hours, cam means arranged to permit axial movement of said wheel member, means for setting the cam means to permit said axial movement at a predetermined time, a spring normally held under tension by said wheel member and moving the same axially when the cam means is set to permit axial movement, a two-armed member rotatably mounted on a pivot, an insulated end part of said spring being in operative connection with one arm of said two-armed member and rotating said two-armed member when the spring is released during the axial movement of said wheel member, a return spring acting upon said two-armed member adapted to return it to its normal position after rotation, a two-armed lever rotatably mounted on a pivot, one lever arm carrying the armature of said electromagnet and the other lever arm being arranged adjacent the other arm of said two-armed member, said two-armed lever being rotated around its pivot upon engagement of said other arm of the two-armed member with the other lever arm, said engagement closing a circuit through the electromagnet, and the rotational movement of said other lever arm closing said electric circuit.

2. A timed switch mechanism comprising, in combination, an electric circuit including a relay operating a switch, a wheel member mounted for rotational and axial movement, timing means for rotating said member to complete one revolution every 24 hours, cam means arranged to permit axial movement of said wheel member, means for setting the cam means to permit said axial movement at a predetermined time, a spring having an insulated end part normally held under tension by said wheel member and moving the same axially when the cam means is set to permit axial movement, a two-armed member rotatably mounted on a pivot, said insulated end part of the spring being in operative connection with one arm of said two-armed member and rotating said two-armed member when the spring is released during the axial movement of said wheel member, a return spring acting upon said two-armed member and adapted to return it to its normal position after rotation, a two-armed lever rotatably mounted on a pivot, one of the lever arms being resilient and being arranged adjacent the other arm of said two-armed member, said two-armed lever being rotated around its pivot upon engagement of said other arm of the two-armed member with said one lever arm, a notch in said one lever arm adapted to engage said other arm of the two-armed member, an electromagnet having a coil, an electrical connection between said one lever arm and one coil terminal, said other arm of the two-armed member being connected in said electric circuit, and an armature carried by the other lever arm, engagement of said one lever arm and said other arm of the two-armed member causing attraction of the armature to the electromagnet when current is fed through the circuit and also causing closing of said electric circuit.

3. A timed switch mechanism comprising, in combination, an electric circuit including a relay operating a switch, two wheel members mounted for rotational and axial movement, timing means for rotating said members to complete one revolution every 24 hours, cam means associated with each of said wheel members and adapted to permit axial movement of each of said members, means for setting the cam means to permit said axial movements at predetermined times, a spring having an insulated end part associated with each of said members and normally held under tension by each of said members, each spring moving the associated member axially when the respective cam means is set to permit axial movement of its associated member, two two-armed members each rotatably mounted on a pivot, the insulated end part of a respective one of said springs being in operative connection with one arm of a respective one of said two-armed members, each two-armed member being rotated when the respective spring is released during the axial movement of the respective wheel member, a return spring acting upon each of said two-armed members and adapted to return it to its normal position after rotation, two two-armed levers each rotatably mounted on a pivot, one of the lever arms of each lever being resilient and being arranged adjacent the other arm of a respective one of said two-armed members, each of said two-armed levers being rotated around its pivot upon engagement of said other arm of the two-armed member with said one lever arm, a notch in each of said one lever arms adapted to engage said other arm of the two-armed member, an electromagnet having a coil, an electrical connection between each of said one lever arms and one coil terminal, each of said other arms of the two-armed members being connected in said electrical circuit, and an armature carried by each of said other lever arms, engagement of said one lever arm and said other arm of the two-armed member causing attraction of the respective armature to the electromagnet when current is fed through the circuit and also causing closing of said electric circuit.

References Cited in the file of this patent

UNITED STATES PATENTS

| | | |
|---|---|---|
| 1,860,159 | Porter | May 24, 1932 |
| 2,421,411 | Clayton | June 3, 1947 |

FOREIGN PATENTS

| | | |
|---|---|---|
| 414,436 | Germany | May 30, 1925 |
| 628,695 | Germany | Apr. 15, 1936 |
| 400,927 | Italy | Dec. 28, 1942 |
| 1,018,243 | France | Oct. 8, 1952 |